(12) United States Patent
Stahl et al.

(10) Patent No.: US 8,739,235 B2
(45) Date of Patent: *May 27, 2014

(54) METHOD AND APPARATUS FOR CHANGING RECEIVED STREAMING CONTENT CHANNELS

(75) Inventors: Thomas Anthony Stahl, Indianapolis, IN (US); John William Richardson, Hamilton, NJ (US)

(73) Assignee: Thomson Licensing, Issy-les moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,744

(22) Filed: May 9, 2012

(65) Prior Publication Data

US 2012/0222076 A1 Aug. 30, 2012

Related U.S. Application Data

(63) Continuation of application No. 09/950,863, filed on Sep. 12, 2001.

(51) Int. Cl.
*H04N 7/173* (2011.01)
(52) U.S. Cl.
USPC .............. 725/105; 725/94; 725/110; 725/116
(58) Field of Classification Search
USPC .................................... 725/94, 105, 110, 116
See application file for complete search history.

(56) References Cited

U.S. PATENT DOCUMENTS

| 5,512,934 A | 4/1996 | Kochanski |
| 5,627,822 A | 5/1997 | Edmaier et al. |
| 5,652,749 A | 7/1997 | Davenport et al. |
| 5,724,646 A | 3/1998 | Ganek et al. |
| 5,734,432 A | 3/1998 | Netravali et al. |
| 5,781,227 A * | 7/1998 | Goode et al. .................... 725/32 |
| 5,930,253 A | 7/1999 | Brueckheimer et al. |
| 5,956,321 A | 9/1999 | Yao et al. |
| 5,963,202 A | 10/1999 | Polish |
| 6,026,506 A | 2/2000 | Anderson et al. |
| 6,078,594 A | 6/2000 | Anderson et al. |
| 6,097,380 A | 8/2000 | Crites et al. |

(Continued)

FOREIGN PATENT DOCUMENTS

EP 0633694 A1 7/1994

OTHER PUBLICATIONS

Lu et al., "Experience in designing a TCP/IP based VOD system over a dedicated network"—Institute of Information Science, Academia Sinica, Taipei, Taiwan, 1997 IEEE, pp. 262-266.

Kamiyama et al., "Renegotiated CBR Transmission in Interactive Video-on-Demand System"—Communication Sciences Institute, Los Angeles, CA, 1997 IEEE, pp. 12-19.

(Continued)

*Primary Examiner* — Pankaj Kumar
*Assistant Examiner* — Charles N Hicks
(74) *Attorney, Agent, or Firm* — Joel M. Fogelson; Vincent E. Duffy

(57) ABSTRACT

An apparatus and method is disclosed in which a buffer receives a first content stream carrying a content channel signal. The first content stream carries the content channel signal at a rate substantially greater than the streaming content playout rate, for initially loading the buffer. The buffer switches its reception of the content channel signal from the first content stream to a second content stream. The second content stream is at a rate substantially the same as the streaming content playout rate. Generally, this switch occurs when some predefined threshold of the content channel signal is buffered.

16 Claims, 3 Drawing Sheets

(56) References Cited

U.S. PATENT DOCUMENTS

| | | | |
|---|---|---|---|
| 6,144,400 | A | 11/2000 | Ebisawa |
| 6,195,692 | B1 | 2/2001 | Hsu |
| 6,233,253 | B1 | 5/2001 | Settle et al. |
| 6,370,688 | B1 | 4/2002 | Hejna, Jr. |
| 6,701,528 | B1 | 3/2004 | Arsenault et al. |
| 6,757,796 | B1 * | 6/2004 | Hofmann ............... 711/159 |
| 6,973,081 | B1 | 12/2005 | Patel |
| 7,237,254 | B1 * | 6/2007 | Omoigui ............... 725/94 |
| 7,373,413 | B1 | 5/2008 | Nguyen et al. |
| 2001/0000138 | A1 | 4/2001 | Bailleul |
| 2001/0000540 | A1 | 4/2001 | Cooper et al. |
| 2001/0001564 | A1 | 5/2001 | Smyers |
| 2001/0001615 | A1 | 5/2001 | Bailleul |
| 2003/0037331 | A1 | 2/2003 | Lee |

OTHER PUBLICATIONS

Carter et al., "Improving bandwidth efficiency of video-on-demand servers"—Department of Computer Science, Santa Cruz, CA, Jan. 1999 Elsevier Science B.V., Computer Networks 31, pp. 111-123.

Kalva et al., "Techniques for Improving the Capacity of Video-on-Demand Systems"—29th annual Hawaii International Conference on system Sciences—1996, pp. 308-315.

Chiu et al., "Partial Video Sequence Caching Scheme for VOD Systems with Heterogeneous Clients"—IEEE Transactions on Industrial Electronics, Birmingham U.K., vol. 45, No. 1, Feb. 1998, pp. 44-51.

Petit et al., "Bandwidth Resource Optimization in Video-on-Demand Network Architectures"—Corporate Research Centre, Antwerp, Belgium, In proceeding of: Community Networking Integrated Multimedia Services to the Home, Aug. 1994, pp. 91-97.

* cited by examiner

METHOD AND APPARATUS FOR CHANGING RECEIVED STREAMING CONTENT CHANNELS

This application is a continuation of co-pending U.S. application Ser. No. 09/950,863, filed Sept. 12, 2001, herein incorporated by reference.

FIELD OF THE INVENTION

The present invention relates to the downloading of streaming content.

BACKGROUND OF THE INVENTION

Proposed methods for carrying digital video programming from a Head End (HE) to a Set Top Box (STB), over a Digital Subscriber Line (DSL) connection, now exist within the industry. In many cases, the digital video is in the form of compressed digital video such as Moving Pictures Experts Group (MPEG) 2 or MPEG 4. Many of these systems utilize video multicast within the HE equipment for efficient distribution of the video to the edge of the network. An important limitation of these systems is that a DSL link has only enough bandwidth to handle one or two video streams (programs) simultaneously.

Because of the bandwidth limitation, one problem that these systems experience is jitter. Jitter is a deviation in, or displacement of, the bit arrival times of a digital signal. Some of the principle causes of jitter include, inter alia, queues in network switches and packet collisions requiring subsequent retransmission. Jitter may also be added to the video stream as the result of the asynchronous transfer mode (ATM) switching or Internet Protocol (IP) routing. Furthermore, jitter may occur as a result of adding to a video stream as the video is distributed within the home from the DSL modem to the STB' over, for example, an Ethernet.

Proposed methods for correcting jitter include, for example, the use of a large de-jittering buffer in the front end of the decoder in the STB. However, de-jittering buffers add a significant and undesirable time delay to the signal. For example, for a de-jittering buffer designed to hold five seconds of video, there would be a five-second delay from the time the video is received by the STB to the time that the video is displayed.

Buffering creates additional problems. For example, if a user changes channels and the system merely connects the STB to a real time video stream, the user will have to wait five seconds for the buffer to fill before a picture will be displayed. This would spoil the channel changing experience that many people expect. For example, many people like to "surf" channels to examine what is on a several particular television channels before settling on a program. Having a long delay each time a new channel is selected would be at odds with the ability to rapidly surf through the various offered channels, and these viewers would find such a delay particularly vexing.

SUMMARY OF THE INVENTION

Therefore, the present invention is a system and method for providing de-jittered streaming content while providing a substantially instantaneous channel changing experience. In accordance with the principles of the present invention, a buffer receives a first content stream carrying a content channel signal. The first content stream carries the content channel signal at a rate substantially greater than the streaming content playout rate. The buffer switches its reception of the content channel signal from the first content stream to a second content stream. The second content stream is at a rate substantially the same as the streaming content playout rate. Generally, this switch occurs when some predefined threshold of the content channel signal is buffered.

BRIEF DESCRIPTION OF THE DRAWINGS

The present invention will be described below in more detail, with reference to the accompanying drawings.

DETAILED DESCRIPTION

Figure 1:
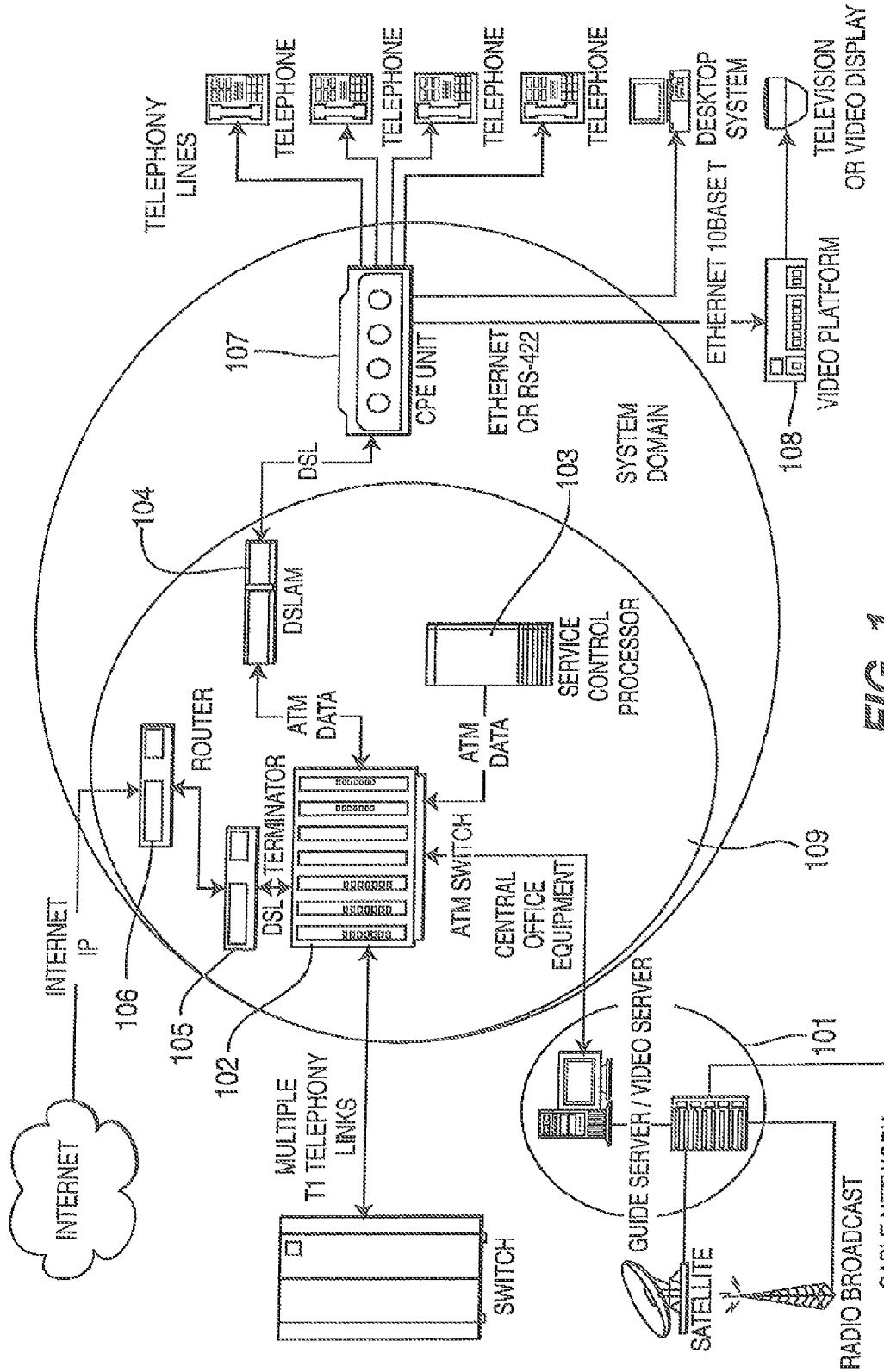
FIG. 1 illustrates a network capable of delivering DSL video in accordance with the principles of the present invention.

The present invention delivers video data to a STB at a rate substantially greater than a display rate for an initial period of time after a new channel has been selected. During this initial time period, a STB buffer is loaded to a desired level. Upon loading the STB buffer, the video connection can be switched to a video multicast connection wherein the STB video decoder receives buffered video from the STB buffer at substantially the same rate as the video display rate. Further, although described in terms of video, the concept and principles of the present invention apply to any form of streaming digital, whether it is video, audio, data, or a combination thereof.

It is to be understood that the present invention may be implemented in various forms of hardware, software, firmware, special purpose processors, or a combination thereof. It is also understood that the present invention may be implemented in software as an application program tangibly embodied on a program storage device. The application program may be uploaded to, and executed by, a machine comprising any suitable architecture. In an exemplary embodiment, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying description and figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, in systems in which the quantity and severity of jitter is frequently a problem, such as in distribution across the Internet, larger de-jittering buffers can be provided on the front end of the decoder which would thereby decrease the instances and severity of jitter by increasing the amount of available buffered video.

Additionally, the present invention can apply to any system distributing video over the Internet from a video Server. The final distribution can be via DSL, dial up, cable modem, Integrated Services Digital Network (ISDN), or any other means of connecting to the Internet. The present invention also applies to systems or network connections that use multicast signals for efficient distribution or simply duplicate the stream and send out individual streams.

Referring to FIG. 1, an illustrative example of a network for delivering DSL video is shown including, inter alia, a video server 101, and ATM switch 102, a Service Control. Processor (SCP) 103. The network includes a DSL Access Multiplexor (DSLAM) 104, for connecting multiple DSL users to the network. The DSLAM 104 connects to the ATM switch 102. The DSLAM 104 demultiplexes the signals and forwards them to appropriate individual DSL connections. The network further includes a DSL Terminator 105, router 106, customer premise equipment (CPE) 107, a STB 108. The video server 101 includes a buffer for each video channel that may be chosen. These buffers can be sized to handle a worst-case jitter scenario that may be displayed at the STB 108, including jitter contributed by the ATM distribution and jitter caused by distribution within a local area network such as Ethernet.

Jitter can range from a few milliseconds to several seconds depending on the distribution channel used. A communication channel for channel changing commands exists between the STB 108 and the HE equipment 109. When a customer turns on a channel or changes channels, a command is sent from the STB 108 to the HE 109. The SCP 103 sets up a connection between the video server 101 and the STB 108. The video server 101 provides video from a HE buffer to the STB buffer 108 at a substantially higher speed (e.g., double-speed) than a normal video viewing speed(e.g., thirty frames per second).

In one exemplary embodiment of the invention, during the transitory period, the connection is set up logically as a point-to-point connection. No other STB will receive the same higher speed stream at exactly the same time. The STB receives the higher speed video stream and starts to display the stream immediately. However, it displays the video at the normal viewing speed. Thus, the video arrives at the STB at a rate faster than it is being displayed or consumed. Accordingly, the de-jittering buffer in the front end of the STB is loaded with video. Once the STB buffer has been filled to a desirable level, the SCP switches the video source to a video stream that can be shared among one or more STBs (e.g., multicast).

Figure 2:
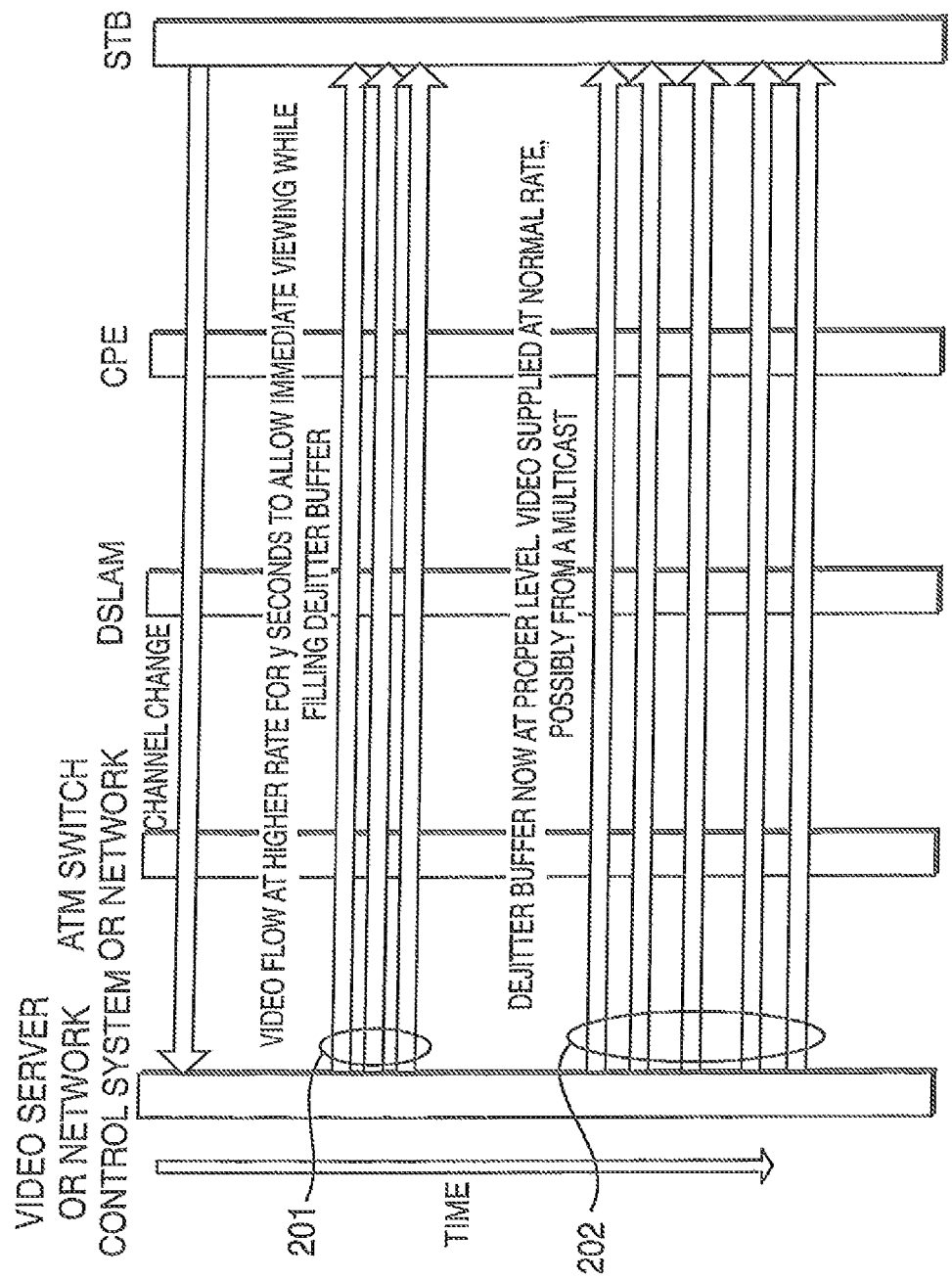
FIG. 2 shows a flow diagram of a channel change mechanism in accordance with the principles of the present invention.

Referring to. FIG. 2, for live broadcasts, the HE will maintain a buffer that is at least as large as the buffer used for de-jittering in the STB. For example, for a five second STB de-jittering buffer, the HE buffer would store five seconds or more of video. When the customer changes channels, the HE will supply delayed video from the HE buffer at a rate 201 higher, e.g., sixty frames per second, than the video rate for normal viewing 202, e.g., thirty frames per second.

In an exemplary embodiment of the invention, the HE buffer is a circular buffer or queue that maintains a level of information. The HE's transmitter will be merely pulling the data from a progressively later time in the buffer. The buffer-remains full at all times, and can therefore handle multiple clients simultaneously by pulling data from different times in the buffer. Data is transferred out of the buffer at a 1× rate, even though data is being sent to the STB buffer at a higher rate, e.g., 3×. However, from the perspective of the STB, it appears that the HE buffer empties.

Since the video is being displayed at the normal speed, but the stream is arriving at the higher speed, the de-jittering buffer in the front end of the decoder will fill to a desirable level. According to the example, once this buffer has filled with five-seconds of video, the HE ceases sending video to the STBs at the higher speed and begins to send video at the normal viewing speed. This can happen in a one-to-one relationship, but can also happen by merely switching the input of the STB to a multicast or broadcast video stream. The Multicast stream is sent in real-time. During the initial stage, the five second delay is due to five seconds of old data being sent from the HE buffer. After switching to multicast, all of the delay is due-to five seconds of video stored in the STB buffer.

The switch from the HE buffered signal to the video stream can be controlled from the HE, because the HE knows at what point the STB has received all of the delayed video from the HE delay buffer and the only video left to send is the real-time video that is being used to fill the delay buffer.

Figure 3:
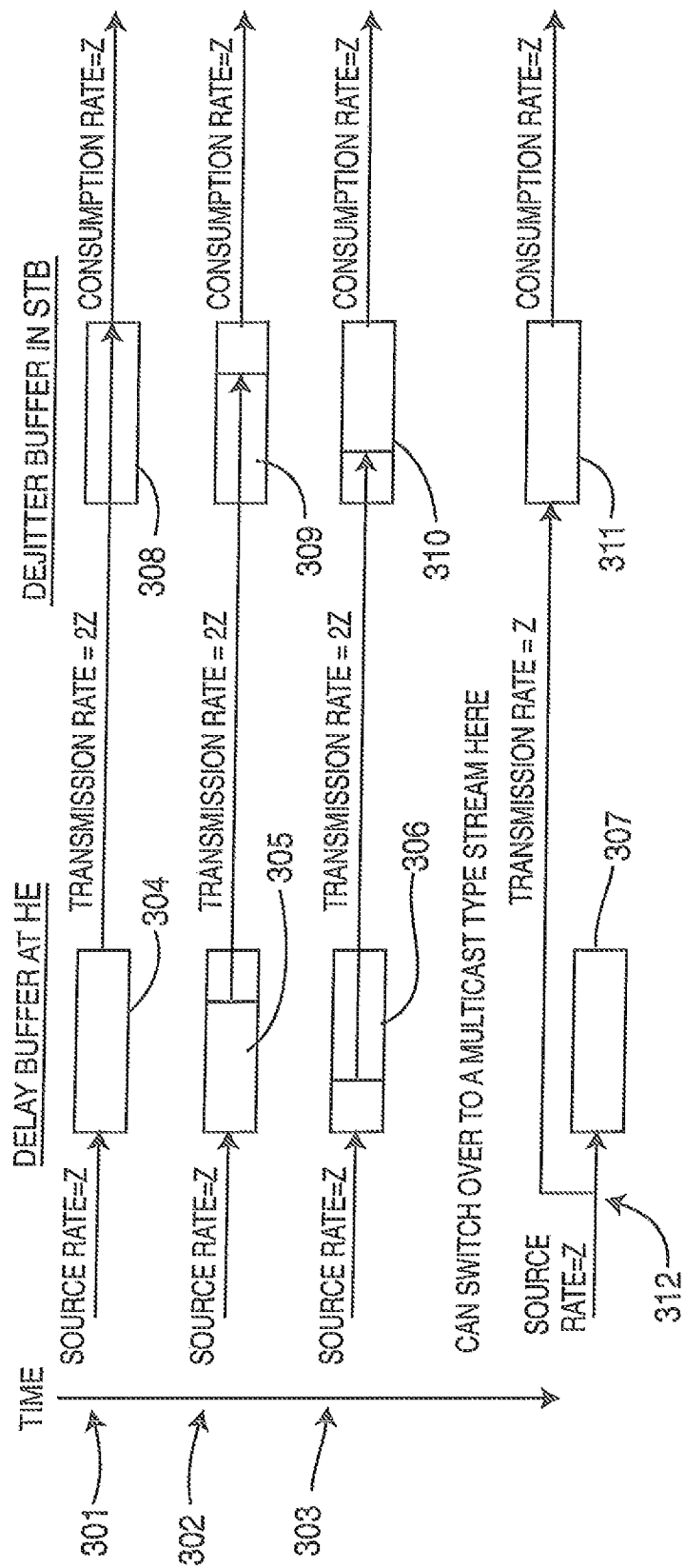
FIG. 3 shows a data transfer from a source buffer to a de-jitter buffer during initial viewing in accordance with the principles of the present invention.

Referring, to FIG. 3, during the transitory channel changing period 301-303, data is transferred from a HE buffer 304-307 to the STB buffer 308-311 until the desired delay is established before switching to the buffered broadcast stream 312. Note that this method can apply to real-time broadcasts such as sports programs, movies, or any other type of video programming.

It is also possible that some, video data may arrive late during the initial few moments after the second change. But the packet delay associated with most video packets is expected to be less than the maximum delay, so this is not expected to be objectionable. Additionally, the likelihood of encountering a late packet will decrease as the decoding buffer fills.

Having described embodiments for a system and method of de-jittering a DSL video distribution system connection, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method of receiving a digital signal comprising the steps of:

receiving, at a buffer located in the front end of the receiver, and at a rate substantially greater than a streaming content playback rate, a first content stream on a first connection carrying a content channel signal, the first connection being a point-to-point connection; and switching from the first content stream to a second content stream on a second connection carrying the same content channel signal, wherein the second connection is one of multicast, broadcast, and asynchronous-transfer-mode point-multipoint, and the second content stream is transferred to the buffer substantially at the playback rate, wherein said switching comprises determining that the buffer includes a predefined amount of channel content data prior to switching, the predefined amount of channel content data corresponding to an amount of data for overcoming jitter during a playback of the content channel signal.

2. The method of claim 1, wherein the content channel signal is comprised of streaming video and/or streaming audio data.

3. The method of claim 1, wherein the step of switching from the first content stream to the second content stream further comprises the step of:
 determining that the buffer is substantially full prior to switching.

4. The method according to claim 1 wherein the content signal represents a real time broadcast.

5. An apparatus for receiving a digital signal comprising:
 means for receiving at a buffer located at the front end of the receiver, and at a rate substantially greater than a streaming content playback rate, a first content stream on a first connection carrying a content channel signal, the first connection being a point-to-point connection; and means for switching from the first content stream to a second content stream on a second connection carrying the same content channel signal, wherein the second connection is one of multicast, broadcast, and asynchronous-transfer-mode point-multipoint, and the second content stream is transferred to the buffer substantially at the playback rate, wherein said means for switching comprise means for determining that the buffer includes a predefined amount of channel content, data prior to switching, the predefined amount of channel content data corresponding to an amount of data for overcoming jitter during a playback of the content channel signal.

6. A method for changing from a first digital video or audio channel to a second digital video or audio channel comprising:
 receiving a channel change command to change from the first digital video or audio channel to the second digital video or audio channel;
 transferring a first video or audio stream on a first connection carrying the second digital video or audio channel from a first buffer to at least a second buffer located at a front end of a receiver at a rate greater than a playback rate, the first connection being a point-to-point connection;
 changing from the first digital video or audio channel to the second digital video or audio channel upon receiving the second digital video or audio channel; and
 switching from the first video or audio stream to a second video or audio stream on a second connection carrying the second digital video or audio channel, wherein the second connection is one of multicast, broadcast, and asynchronous-transfer-mode point-multipoint, and the second video or audio stream is transferred to the second buffer substantially at the playback rate and said first video or audio stream and said second video or audio stream are the same content signal.

7. The method according to claim 6, wherein the content signal represents a real time broadcast.

8. The method according to claim 6, wherein said switching comprises determining that the buffer includes a predefined amount of channel content data prior to switching, the predefined amount of channel content data corresponding to an amount of data for overcoming jitter during a playback of the content channel signal.

9. The method of claim 6, wherein the first and second video or audio streams comprise a digital subscriber line signal.

10. The method of claim 6, further comprising the step of loading the first buffer with the first video or audio stream at about the playback rate.

11. The method of claim 6, wherein the digital video or audio channel is distributed to the second buffer by one of a digital subscriber line, a cable modem and an integrated services digital network.

12. A system for changing from a first digital video or audio channel to a second digital video or audio channel characterized by:
 means for receiving a channel change command to change from the first digital video or audio channel to the second digital video or audio channel;
 means for transferring a first video or audio stream on a first connection carrying the second digital video or audio channel from a first buffer to at least a second buffer located at a front end of a receiver at a rate substantially greater than a playback rate, the first connection being a point-to-point connection;
 means for changing from the first digital video or audio channel to the second digital video or audio channel upon receiving the second digital video or audio channel; and
 means for switching from the first video or audio stream to a second video or audio stream on a second connection carrying the second digital video or audio channel, wherein the second connection is one of multicast, broadcast, and asynchronous-transfer-mode point-multipoint, and the second video or audio stream is transferred to the second buffer substantially at the playback rate and said first video or audio stream and said second video or audio stream are the same content signal.

13. The system of claim 12, wherein said means for switching comprise means for determining that the buffer includes a predefined amount of channel Content data prior to switching, the predefined amount of channel content data corresponding to an amount of data for overcoming jitter during a playback of the content channel signal.

14. A program storage device readable by machine, tangibly embodying a program, of instructions executable by the machine to perform method steps for changing from a first digital video or audio channel to a second digital video or audio channel, the method steps comprising:
 receiving a channel change command to change from the first digital video or audio channel to the second digital video or audio channel;
 transferring a first video or audio stream on a first connection carrying the second digital video or audio channel from a first buffer to at least a second buffer located at a front end of a receiver at a rate substantially greater than a playback rate, the first connection being a point-to-point connection;
 changing from the first digital video or audio channel to the second digital video or audio channel upon receiving the second digital video or audio channel; and
 switching from the first video or audio stream to a second video or audio stream on a second connection carrying the second digital video or audio channel, wherein the second connection is one of multicast, broadcast, and asynchronous-transfer-mode point-multipoint, and the second video or audio stream is transferred to the second buffer substantially at the playback rate.

15. The device of claim 14, wherein said switching comprises determining that the buffer includes a predefined amount of channel content data prior to switching, the predefined amount of channel content data corresponding to an amount of data for overcoming jitter during a playback of the content channel signal.

16. A program storage device readable by machine, tangibly embodying a program of instructions executable by the machine to perform method steps for receiving a digital signal, the method steps comprising:

receiving, at a buffer located at a front end of a receiver and at a rate substantially greater than a streaming content playback rate, a first content stream on a first connection carrying a content channel signal, the first connection being a point-to-point connection; and switching from the first content stream to a second content stream on a second connection carrying the same content channel signal, wherein the second connection is one of multicast, broadcast, and asynchronous-transfer-mode point-multipoint, and the second content stream transferred to the buffer substantially at the playback rate, wherein said switching comprises determining that the buffer includes a predefined amount of channel content data prior to switching, the predefined amount of channel content data corresponding to an amount of data for overcoming jitter during a playback of the content channel signal.

* * * * *